United States Patent
Gough

(10) Patent No.: US 8,051,214 B1
(45) Date of Patent: Nov. 1, 2011

(54) LASER DATA COMMUNICATION SYSTEM

(75) Inventor: Michael Gough, Ben Lomond, CA (US)

(73) Assignee: G&H Nevada-Tek, Los Altos, CA (US)

( * ) Notice: Subject to any disclaimer, the term of this patent is extended or adjusted under 35 U.S.C. 154(b) by 0 days.

(21) Appl. No.: 12/782,635

(22) Filed: May 18, 2010

Related U.S. Application Data

(63) Continuation of application No. 11/743,141, filed on May 1, 2007, now Pat. No. 7,730,217, which is a continuation of application No. 09/760,209, filed on Jan. 12, 2001, now Pat. No. 7,219,165.

(60) Provisional application No. 60/176,138, filed on Jan. 14, 2000.

(51) Int. Cl.
*G06F 15/16* (2006.01)

(52) U.S. Cl. ........ 709/250; 709/238; 375/220; 396/128; 396/130

(58) Field of Classification Search .................. None
See application file for complete search history.

(56) References Cited

U.S. PATENT DOCUMENTS

| | | | |
|---|---|---|---|
| 4,926,415 A | 5/1990 | Tawara et al. | |
| 4,975,926 A | 12/1990 | Knapp | |
| 4,982,445 A * | 1/1991 | Grant et al. | 398/124 |
| 5,077,732 A | 12/1991 | Fischer et al. | |
| 5,510,923 A | 4/1996 | Phillipe et al. | |
| 5,687,314 A * | 11/1997 | Osman et al. | 714/49 |
| 5,726,786 A | 3/1998 | Heflinger | |
| 5,883,356 A * | 3/1999 | Bauer et al. | 219/121.62 |
| 5,953,507 A | 9/1999 | Cheung et al. | |
| 5,959,752 A * | 9/1999 | Ota | 398/119 |
| 6,104,513 A * | 8/2000 | Bloom | 398/117 |
| 6,323,980 B1 * | 11/2001 | Bloom | 398/129 |
| 6,360,035 B1 | 3/2002 | Hurst et al. | |
| 6,466,771 B2 | 10/2002 | Wood, Jr. | |
| 6,587,450 B1 | 7/2003 | Pasanen | |
| 6,681,116 B1 * | 1/2004 | Johnson | 455/552.1 |
| 6,701,092 B2 | 3/2004 | Doucet et al. | |

* cited by examiner

*Primary Examiner* — Eron J Sorrell

(74) *Attorney, Agent, or Firm* — TIPS Group

(57) ABSTRACT

A system and method are provided for accelerating data transfer between networked databases. First provided are a plurality of databases coupled by a network. At least one laser unit is coupled to each database. In operation, such laser units are capable of communicating data between the databases via free space by way of a laser beam. This allows data communication at a rate faster than that which the network is capable.

10 Claims, 6 Drawing Sheets

LASER DATA COMMUNICATION SYSTEM

CROSS REFERENCE TO RELATED APPLICATIONS

This application is a continuation of U.S. Ser. No. 11/743,141, filed May 1, 2007 now U.S. Pat. No. 7,730,217, which is a continuation of Ser. No. 09/760,209, filed Jan. 12, 2001 now U.S. Pat. No. 7,219,165, which claims the benefit of 60/176,138, filed on Jan. 14, 2000, all of which are herein incorporated by reference.

FIELD OF THE INVENTION

The present invention relates to data communication and more particularly to data communication between networked servers.

BACKGROUND OF THE INVENTION

In the recent past, there has been a vast increase in the amounts of data transferred over networks. One of the primary reasons for such increased communication of data is the presence of larger, new and improved networks with the ability to transfer data at high transmission rates. One example of a network where data is being communication at an ever increasing rate is the Internet.

The Internet and other wide area networks commonly include a plurality of databases, or servers, which are connected by way of a system of communication lines. Such communication lines are traditionally constructed from a metallic, fiber optic, or likewise material to afford "hard-line" communication. In operation, users often access one of the servers in order to communicate data to another one of the servers which may be accessed by another user.

With the increasing popularity of the Internet, there has been a significant rise in demand for access to servers. This demand, in turn, has prompted the construction of large warehouses of servers which are connected to servers outside the building structure by way of the Internet, and connected to the remaining servers via a local area network (LAN) such as an Ethernet.

Prior art FIG. 1 illustrates a warehouse 100 with a plurality of interconnected servers 102. Communication between the servers 102 within the warehouse 100 is supported by a local area network 104, i.e. Ethernet, and a router 106, Such router 106 directs data received from one of the servers 102 to another one of the servers 102 by way of either the Internet 108 or the local area network 104.

The router 106 is often incapable of instantly directing data to a server 102 upon the receipt thereof. This results in an unacceptable latency, or a delay, during data trafficking between the networked servers. This delay has in the past been dwarfed by the delay associated with data transfer between a client computer of a user and a server. Such connections to the servers, however, are exhibiting faster and faster data transfer rates. This trend is rendering the delay between the network servers to be a significant "bottleneck."

There is thus a need for a system and method for providing an alternate data communication medium among networked databases that is capable of alleviating such delay, especially among networked databases in a single building structure.

SUMMARY OF THE INVENTION

A system and method are provided for accelerating data transfer between networked databases. First provided are a plurality of databases coupled by a network. At least one laser unit is coupled to each database. In operation, such laser units are capable of communicating data between the databases via free space by way of a laser beam. This allows data communication at a rate faster than that which the network is capable.

In one embodiment, the network includes a router and an Ethernet, and each laser unit includes a transmitter and a receiver. Further, each laser unit may be mounted on the associated database such that the laser units are capable of moving with two degrees of freedom. As an option, a plurality of laser units are mounted on each of the databases for allowing simultaneous communication between multiple databases.

In another aspect of the present invention, the databases may be positioned in a single housing or building structure. As an option, the housing may have a reflective surface positioned therein for reflecting the laser beam between the laser units. In one embodiment, the housing may be equipped with a substantially hemi-spherical or spherical configuration in order to allow data communication without interference from various databases within the housing.

In another embodiment, the laser units may communicate the data between the databases upon a rate of the communication exceeding a predetermined amount to a single address in one of the databases. Prior to data communication, the laser units may be movably positioned based on a look-up table. The laser beam of the laser units may also be traced prior to the laser units communicating the data in order to determine whether the laser units are capable of communicating the data. If the trace is unsuccessful, an alternate path may be determined for the laser beam, or the data may be communicated via the network.

These and other advantages of the present invention will become apparent to those skilled in the art upon a reading of the following descriptions of the invention and a study of the several figures of the drawing.

DETAILED DESCRIPTION OF THE PREFERRED EMBODIMENTS

Figure 1:
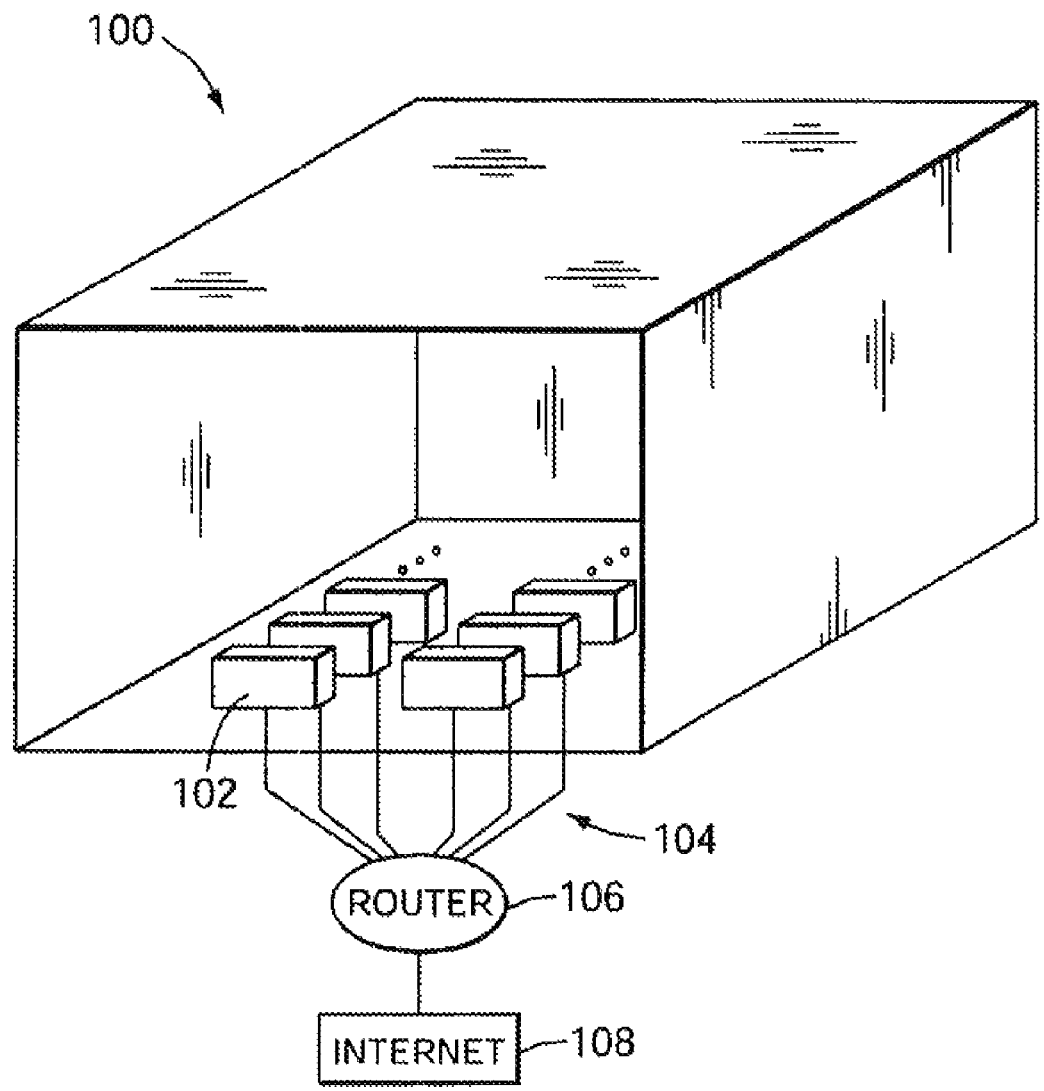
FIG. 1 illustrates a plurality of interconnected databases, or servers, in accordance with the prior art.

FIG. 1 illustrates a plurality of interconnected databases, or servers, in accordance with the prior art. FIGS. 2-7 illustrate a system and method for providing data, communication among networked databases by way of laser units that are capable of alleviating delay often associated with conventional networks. This is accomplished by coupling at least one laser unit to each of the databases. In operation, such laser units are capable of communicating data between the databases via free space by way of a laser beam. This allows data communication at a rate faster than that which the conventional "hard-line" network is capable.

Figure 2:
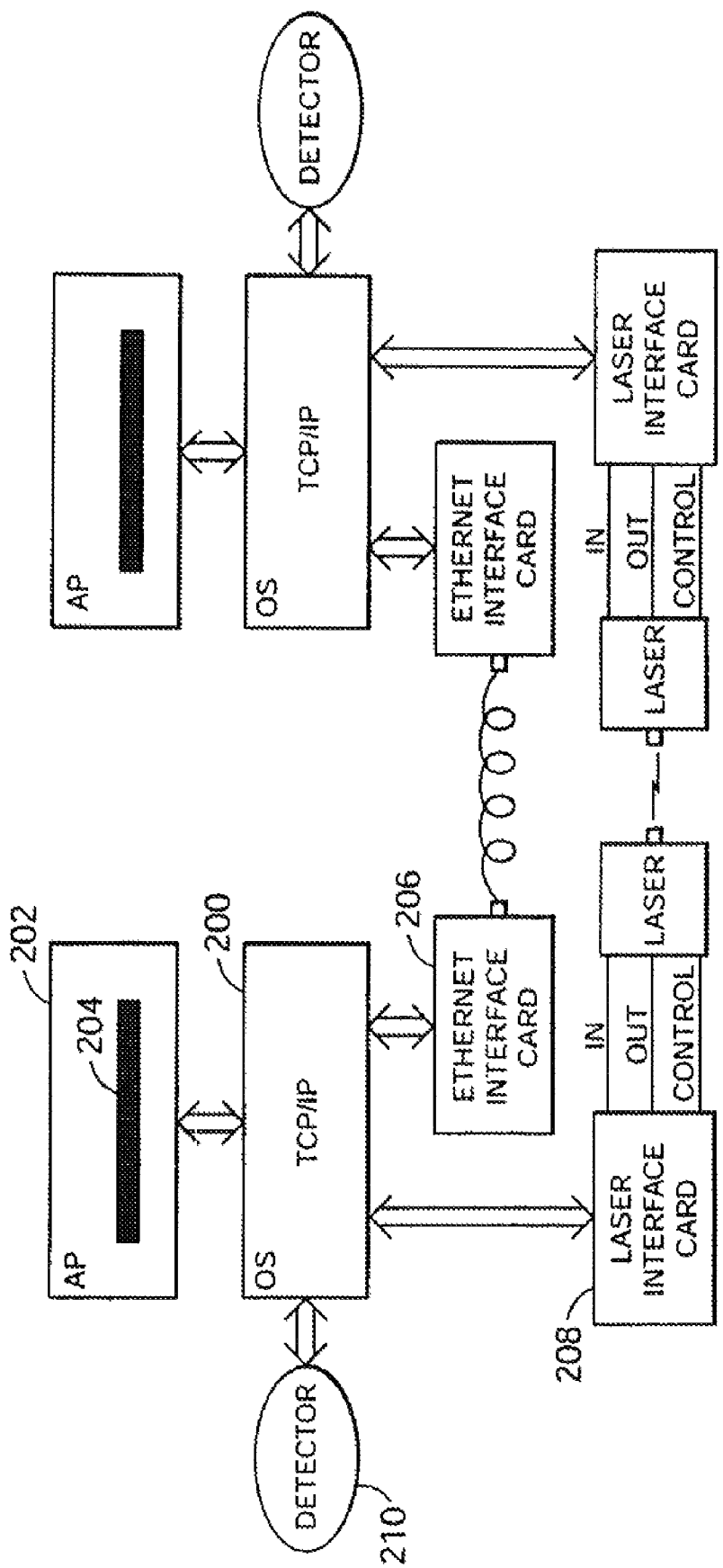
FIG. 2 is a schematic diagram illustrating the various components of each database and the manner in which data is communicated therebetween.

FIG. 2 is a schematic diagram illustrating the various components of each database and the manner in which data is communicated therebetween. As shown, each database is equipped with an operating system 200 that is capable of executing a plurality of application programs 202. During such execution, the application programs 202 generate data that is to be communicated to another database. Such data is often queued in a buffer 204.

Coupled to the operating system 200 is a first interface card 206 adapted to allow communication of the data over a dynamically reconfigurable local area network (LAN) such as an Ethernet to a router which may in turn communicate the data to another database over a "hard-line" network utilizing a TCP/IP or IPX protocol. Such network may also include free space radio transmission. In addition, the operating system 200 may also be coupled to a second laser unit interface card 208 which is capable of communicating the data to another database via a laser unit.

To accomplish this, the laser unit interface card 208 is equipped with an input terminal for receiving data from a receiver of the associated laser unit, an output terminal for transmitting data to a transmitter of the associated laser unit, and a control terminal for controlling the laser unit. As will be set forth later, such control is administered by the operating system 200 under the instruction of a detector application program 210. It should be noted that during transmission, various protocols such as the Diffie Hellman Protocol may be employed to ensure that data is transmitted properly and securely.

Figure 3:
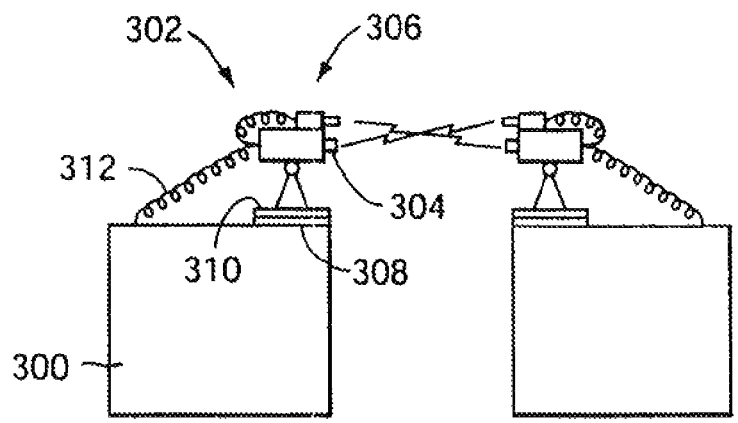
FIG. 3 illustrates a pair of databases that are interconnected via a network in accordance with one embodiment of the present invention.

FIG. 3 illustrates a pair of databases 300 that are interconnected via a network in accordance with one embodiment of the present invention. As shown, each database 300 has at least one laser unit 302 mounted thereon each including a transmitter 304 and a receiver 306. In one embodiment, the transmitter 304 of each laser unit 302 may extend from its end with the receiver 306 situated thereabove.

As shown in FIG. 3, the laser beams transmitted by each transmitter 304 may intercept each other during simultaneous transmission between the transmitters 304 and the receivers 306. As is well known to those of ordinary skill, such interception does not afford any significant interference.

In one embodiment, the laser may include a laser manufactured by TEXAS INSTRUMENTS or BELL LABS, or any another type of laser capable of communicating data. Such lasers are typically capable of high transmission rates which are significantly greater than the transmission rates of the Ethernet LAN that are commonly in the order of 10-100 Mbs.

Further, each laser unit 302 may be mounted on the associated database 300 such that the laser units 302 are capable of moving with two degrees of freedom. To accomplish this, each laser unit 302 may be equipped with a base 308 having a mount 310 rotatably coupled thereto about a vertical axis. The laser unit, in turn, may be pivotally coupled to the mount 310 about a horizontal axis. Flexible coiled wire 312 may then be utilized to couple the transmitter 304 and the receiver 306 of the laser unit 302 to the associated database 300. As an option, a plurality of laser units 302 are mounted on each of the databases 300 for allowing simultaneous communication between multiple databases 300.

Each rotatable and pivotal coupling of the laser units 302 includes a step motor or the like to allow specific direction of the laser unit 302. It should be noted that various other electro-mechanical traducers and specifically tailored movement algorithms may be used that are common in the security camera arts. Such tailored algorithms may be specifically designed to ensure proper operation of the mechanics of the laser unit. For example, rotation of the laser unit 302 may be controlled to the extent that the flexible coiled wire 312 is not wrapped around laser unit 302 due to over rotation.

Figure 4:
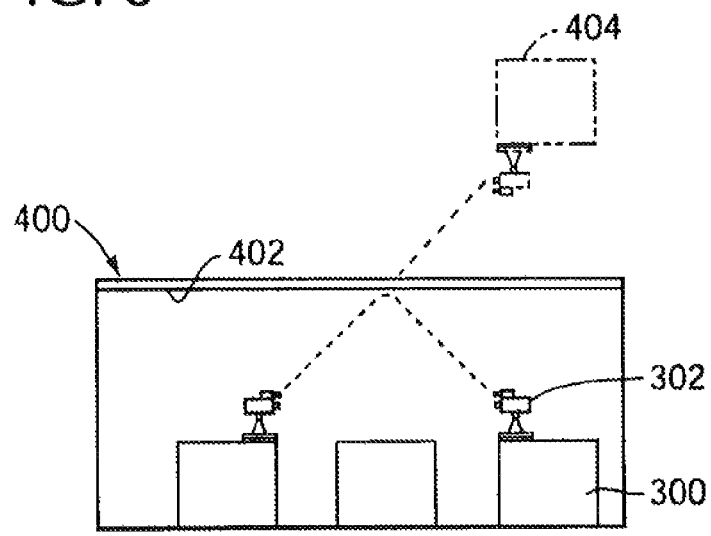
FIG. 4 illustrates the databases of the present invention situated in a single housing, or building structure, in accordance with one embodiment of the present invention.

FIG. 4 illustrates the databases 300 of the present invention situated in a single housing 400, or building structure, in accordance with one embodiment of the present invention. As shown, the housing 400 may be equipped with a reflective surface 402 positioned therein for reflecting the laser beam between the laser units 302. In one embodiment, the reflective surface 402 may be positioned on a ceiling of the housing 400. In such embodiment, the laser units 302 may communicate data by directing laser beams at the reflective surface 402 in order to avoid interference from various mechanical structures within the housing 400 including ducts, pillars, and the databases 300 themselves. In operation, the laser units 302 may direct laser beams at a "phantom" laser unit 404 in order to obtain the necessary reflection angle to allow data communication.

Figure 5:
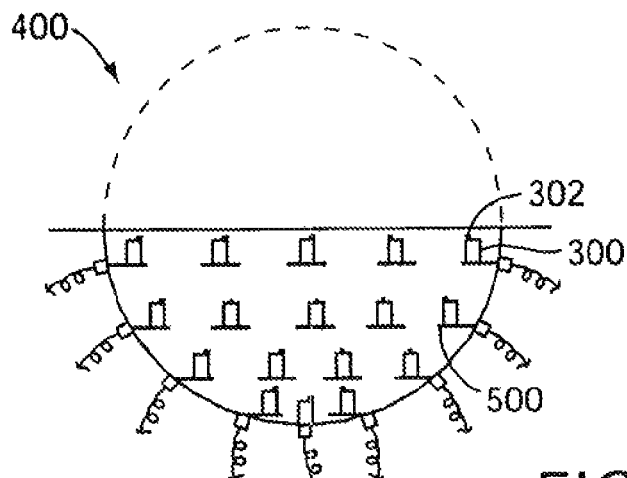
FIG. 5 illustrates an alternate configuration for housing the databases in order to facilitate communication therebetween via the laser units.

FIG. 5 illustrates an alternate configuration for housing the databases 300 which facilitates communication via the laser units 302. As shown, the housing 400 may be equipped with a substantially hemi-spherical or spherical configuration for providing data communication without interference from various databases 300 within the housing 400. In such embodiment, an interior surface of the housing 400 may be equipped with a plurality of shelves 500 each adapted for supporting an associated database 300. By this structure, a plurality of cables and/or control lines may be coupled to the databases 300 and run to a place that is easily accessible by a user. As an option, a bulb-like laser beam emitting source may be positioned at the center of the housing 400 for communicating information with each of the receivers 306 of the laser units 302 by transmitting a vast number of laser beams radially from the source.

It should be noted that the principles disclosed herein may also be employed in outdoor applications including data transmissions to the moon and outer space. In such applications, various measures may be employed to prevent interference from sunlight, etc. For example, hoods may be retrofitted onto the laser units 302.

Figure 6:
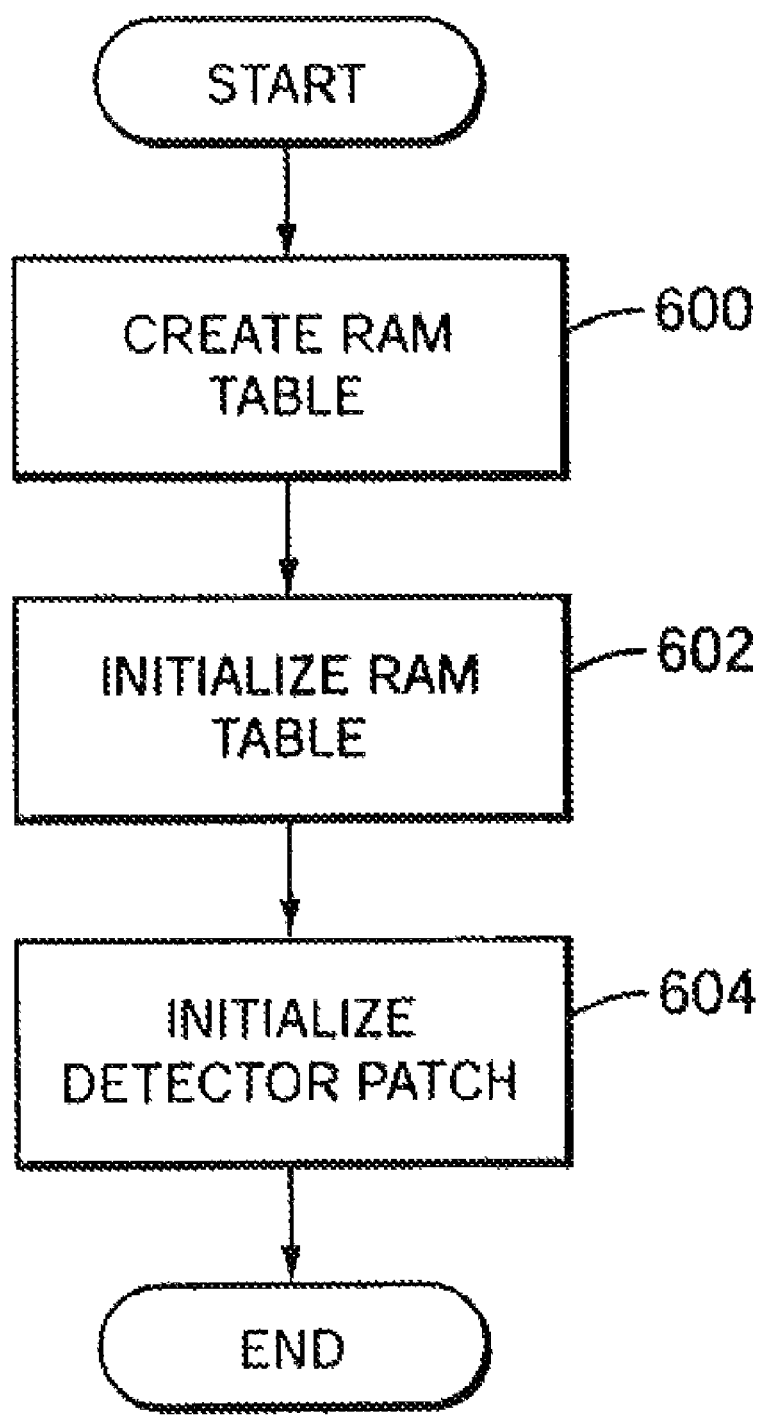
FIG. 6 illustrates an initial process that is executed at start-up of each of the databases.

FIG. 6 illustrates an initial process that is executed at start-up of each of the databases 300. As shown, the process is started in operation 600 by creating a random access memory (RAM) look-up table. Such look-up table is capable of storing physical coordinates of the laser units 302 of each of the databases 300 in terms of destinations, or IP addresses. In use, these coordinates may be used to direct the transmitters 304 and receivers 306 of the laser units 302 in the appropriate direction during data communication. In one embodiment, the look-up table may be located in a central database with which each remaining database 300 has a communication link.

With reference still to FIG. 6, the RAM look-up table is initialized in operation 602. During initialization, the RAM look-up table is set to reflect that no current communications are taking place via the laser units 302. Thereafter, in operation 604, the detector patch application program 210 is installed for working in conjunction with the operating system 200 of the database 300 to monitor the rate of data communication via the hard-line network for reasons that will be set forth hereinafter. As will soon become apparent, the RAM look-up table is utilized to store various information that is used throughout the process of the present invention.

Figure 7:
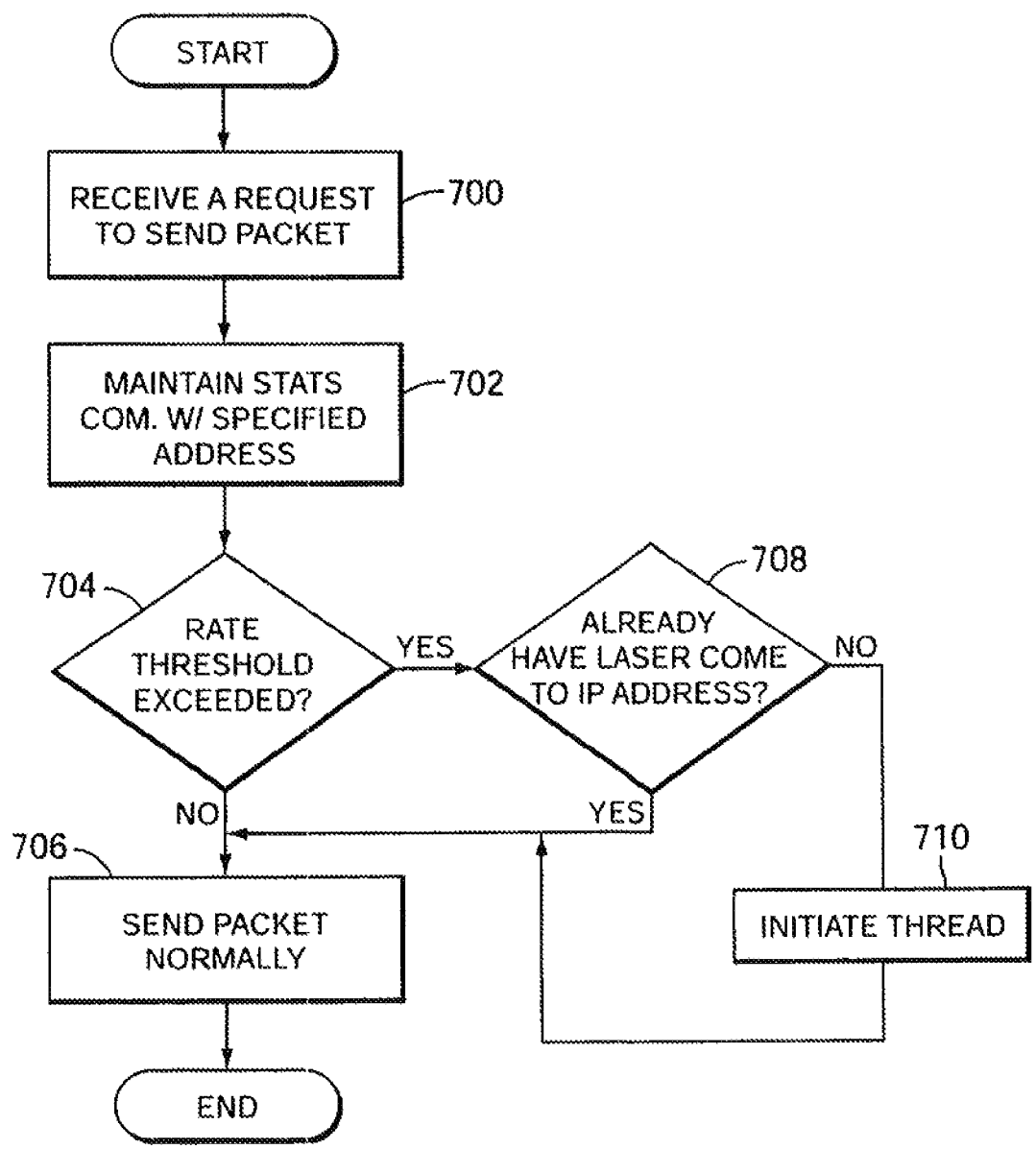
FIG. 7 is a flowchart associated with a method that is executed each time the operating system receives a request from an application program to communicate data.

FIG. 7 is a flowchart associated with a method that is executed each time the operating system 200 receives a request from an application program 202 to communicate data. As shown, such method begins in operation 700 by receiving a request from the application program 200. Such request is commonly accompanied with a destination, or IP address, to which data is to be sent along with the actual data that is desired to be sent.

As indicated in operation 702, a tally of data communication to various IP addresses is maintained to track a current data transfer rate thereto. As an option, such tally may only be maintained for "point-to-point" IP addresses that are resident in databases 300 within the housing 400. To accomplish this, a hash table may be used which includes the IP addresses which are existent in databases 300 within the housing 400. If the IP address is found in such hash table, the tally is continuously tracked. The statistics associated with the tally may take any form including a histogram or the like. Since the statistics are accessed frequently, they may be conveniently stored in the RAM look-up table.

With continuing reference to FIG. 7, it is determined in decision 704 as to whether the current data transfer rate to a particular destination has exceeded a predetermined quantity. If not, the data is communicated by way of the hard-line network via the Ethernet interface card 206. Note operation 706.

If, on the other hand, it is determined in decision 704 that the current data transfer rate to a particular destination has exceeded a predetermined quantity, it is then determined whether laser communication is already allocated to a destination, or whether laser communication is even possible due to obstacles and such. Note decision 708. If laser communication is already allocated to a destination or simply not possible for some reason, the data is communicated by the hard-line network via the Ethernet interface card 206 in operation 706.

If it is determined that laser communication is not already allocated to a destination and is feasible, a line of data communication is established via laser units 302 using the laser unit interface card 208 by initializing a thread, as indicated in operation 710. Once the thread is initialized in operation 710, the process continues in operation 706 where the operating system 200 is now aware of not only the conventional hard-line communication with the destination, but also the communication via the laser units 302.

Figure 8:
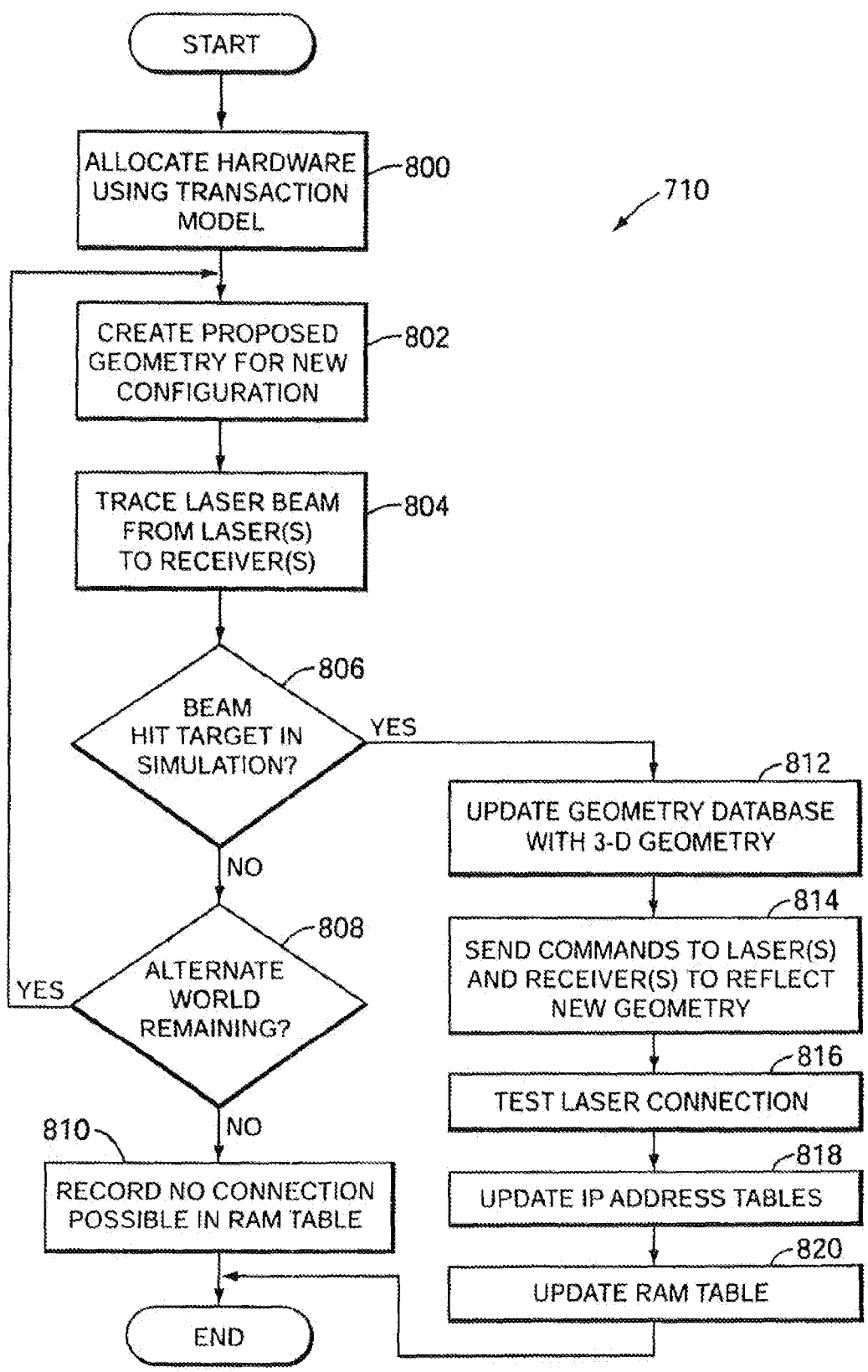
FIG. 8 is a flowchart of the method associated with initializing the thread in operation 710 of FIG. 7.

FIG. 8 is a flowchart of the method associated with initializing the thread in operation 710 of FIG. 7. Such initialization begins in operation 800 by first allocating the appropriate hardware using a transaction model. In the present description, the transaction model may include an Enterprise Java Bean available from SUN, and is commonly known to those of ordinary skill in the art. Hardware that is allocated would include the transmitters 304 and receivers 306 of the laser units 302 involved in establishing the desired data communication link.

Next, in operation 802, proposed geometry for a new configuration is created. Such geometry refers to a potentially feasible path between the physical coordinates of the appropriate laser units 302 by which the laser beam may be directed to accomplish data communication. In order to accomplish this task, the geometry employs a mathematical model representative of the location of the laser units 302, reflective surfaces 402, and obstacles in the housing 400.

With continuing reference to FIG. 8, the proposed geometry is traced between the transmitters 304 and receivers 306 of the appropriate laser units 302 in operation 804. Tracing may include "ray tracing" where it is ensured that a path is available for communicating with a receiver 306 of a designated laser unit 302. This may be accomplished via analysis of the aforementioned mathematical model.

It is then determined in decision 806 as to whether the laser beam hit its intended target during the simulation associated with operation 804. This may be verified by transmitting verification indicators over the hard-line network. If the simulation failed, it may be determined in decision 808 whether any alternate geometries exist. If so, operation 802-806 may be repeated for the alternate geometry. If not, however, a flag is set in operation 810 indicating that no data communication with the desired destination is feasible by way of the laser units 302. This flag may then be stored in the RAM look-up table and utilized by the operating system 200 in operation 708 of FIG. 7 in order to decide whether to execute standard hard-line communication.

If, however, it is determined in decision 806 that the laser beam did indeed hit its intended target during the simulation associated with operation 804, a geometry database is updated in operation 812 for retrieval and reuse during a subsequent transmission to the corresponding destination. Thereafter, in operation 814, commands which are indicative of the new geometry are sent to the appropriate laser units 302 for alignment purposes.

The laser beam communication is then tested in operation 816. In order to test the laser beam communication, data may be transmitted by both the laser units 302 and the hard-line network for comparison purposes at a receiving database. This may be employed primarily for the purpose of ensuring the integrity of the proposed geometry by way of simulation. Next, the IP address tables and the RAM look-up tables are updated in operations 818 and 820, respectively, to reflect the confirmed geometries for later reuse.

During data transmission, the data transmission rate between the laser units 302 may be monitored. If such data transmission rate falls below the predetermined amount, information may instead be transmitted via the hard-line network. This allows the laser units 302 to be redirected to establish an enhanced data communication link with another destination.

While this invention has been described in terms of several preferred embodiments, it is contemplated that alternatives, modifications, permutations and equivalents thereof will become apparent to those skilled in the art upon a reading of the specification and study of the drawings. It is therefore intended that the true spirit and scope of the present include all such alternatives, modifications, permutations and equivalents.

What is claimed is:

1. A free space data transmission device comprising:
   an interface apparatus having a TCP/IP communication port and a laser-out port, said TCP/IP communication port being adapted for communication via a TCP/IP protocol with a digital processing device; and
   a free space laser coupled to said laser-out port of said interface and adapted to produce a free space laser beam communication utilizing said TCP/IP protocol, said free space laser being movable with at least two degrees of freedom;
   wherein said interface apparatus further includes a laser-in port and a receiver coupled to said laser in-port, and wherein said digital processing device includes non-transitory computer readable media including a database of receivers and code segments for producing a 3D geometric mathematical model utilizing said database of receivers to aim said free space laser prior to producing said free space laser beam communication.

2. A free space data transmission device as recited in claim 1 wherein said free space laser beam communication is adapted to communicate with at least one of outer space and the moon.

3. A free space data transmission device as recited in claim 1 wherein said free space laser is located at least one of outer space and the moon.

4. A free space laser beam data transmission device comprising:
an interface apparatus having a TCP/IP communication port and a laser-out port, said TCP/IP communication port being adapted for communication via a TCP/IP protocol with a digital processing device; and
a free space laser coupled to said laser-out port of said interface and adapted to produce a free space laser beam communication utilizing said TCP/IP protocol, wherein said laser moves with at least two degrees of freedom and is movably positioned into alignment prior to commencing said free space laser beam communication after a geometric model is used to mathematically trace said laser beam.

5. A free space data transmission device as recited in claim 4 wherein said interface apparatus further includes a laser-in port and further comprises a receiver coupled to said laser-in port.

6. A free space data transmission device as recited in claim 4 wherein said laser communicates with at least one of outer space and the moon.

7. A free space data transmission device as recited in claim 4 wherein said laser is located in outer space or on the moon.

8. A free space data transmission device as recited in claim 4 wherein said digital processing device includes non-transitory computer readable media including program instructions for aiming said laser.

9. A free space data transmission device as recited in claim 8 wherein said geometric model is a 3D geometric model.

10. A free space data transmission device as recited in claim 9 wherein said 3D geometric model is derived, at least in part, utilizing a database of receiver information.

* * * * *